June 5, 1962  R. F. GARBARINI ET AL  3,037,289
DIRECTIONAL REFERENCE CORRECTION SYSTEM
Filed July 7, 1953  3 Sheets-Sheet 1

INVENTORS
ROBERT F. GARBARINI
ROBERT L. WENDT
HERBERT RAWITZ
BY
R. V. Craddock
ATTORNEY

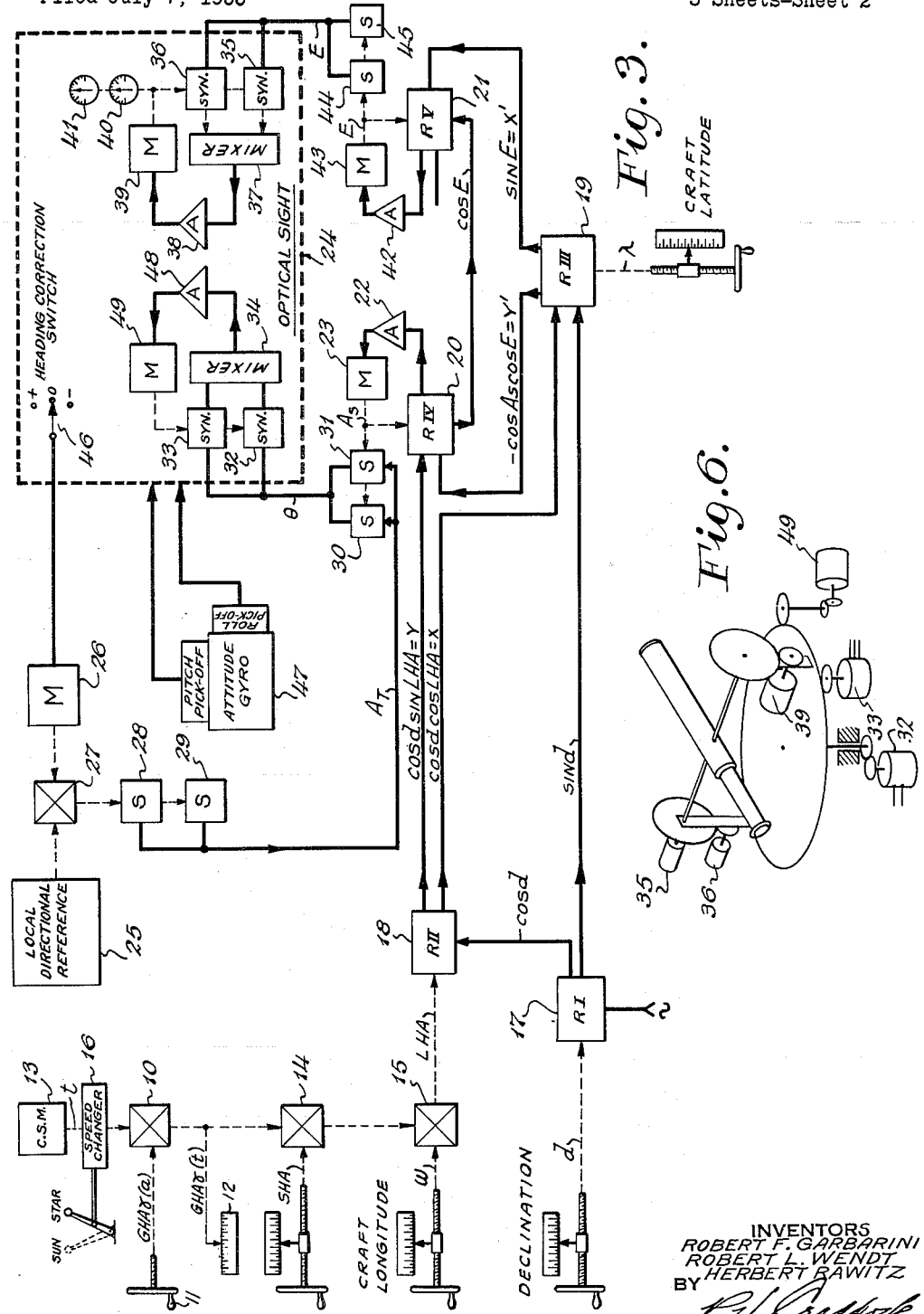

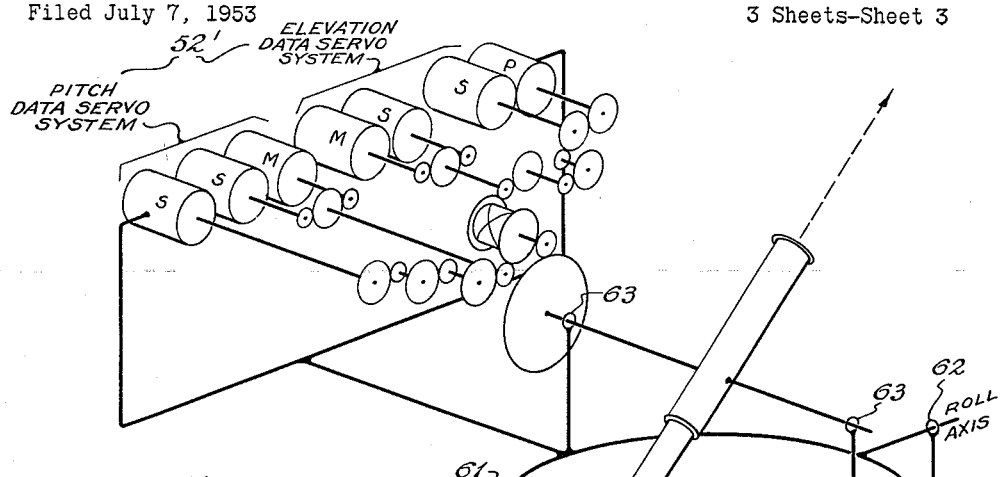
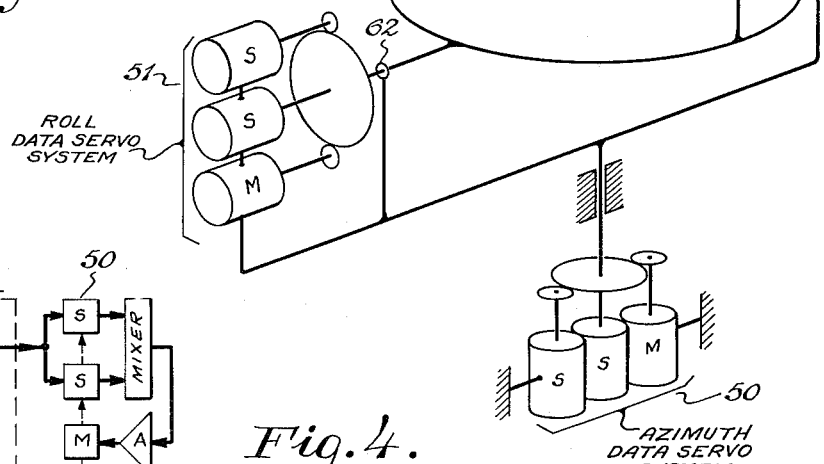
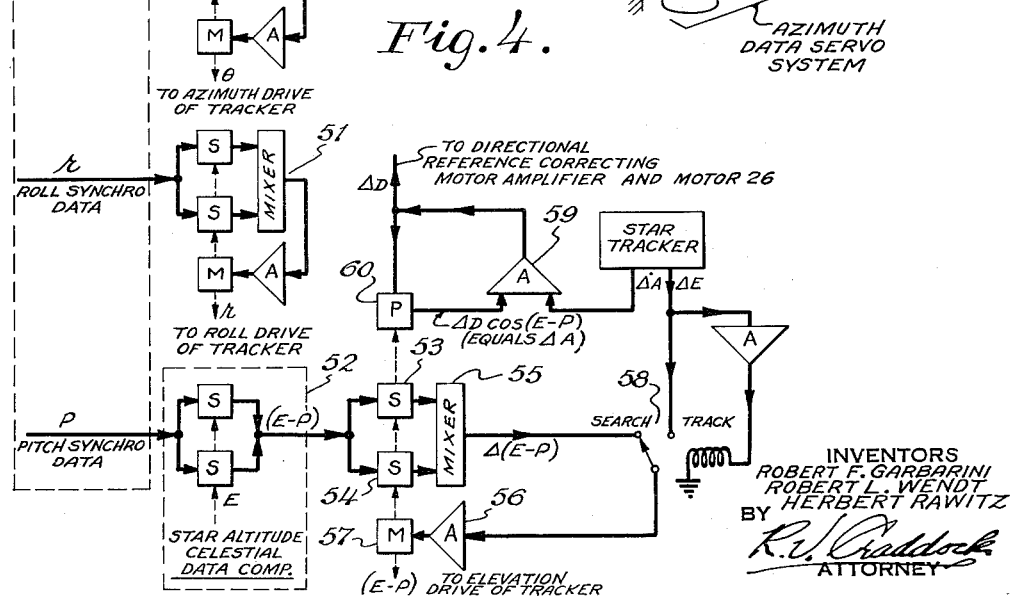
Fig. 5.
Fig. 4.
INVENTORS
ROBERT F. GARBARINI
ROBERT L. WENDT
HERBERT RAWITZ
BY
ATTORNEY

United States Patent Office 3,037,289
Patented June 5, 1962

3,037,289
DIRECTIONAL REFERENCE CORRECTION SYSTEM
Robert F. Garbarini, Woodside, Robert L. Wendt, Glen Head, and Herbert Rawitz, Wantagh, N.Y., assignors to Sperry Rand Corporation, a corporation of Delaware
Filed July 7, 1953, Ser. No. 366,516
19 Claims. (Cl. 33—61)

This invention relates to a system for correcting drift or error in a local directional reference on a craft such as a ship or airplane. More particularly, it is concerned with computing true geographical North, for instance, from readily ascertainable data with respect to a chosen celestial body together with navigational positional data with respect to the craft.

The present invention provides a system that provides true heading data by checking and correcting a local directional reference such as used by the navigation or steering controls of a ship or aircraft. The errorless heading data obtained is independent of the actual travel or flight path of the ship or craft with relation to the earth. Readily obtainable information such as sun or star data from a nautical almanac, and the location of the craft in terms of latitude and longitude, are inserted in the correcting system by the operator. These data are combined with the azimuthal position of the craft from the local directional reference being monitored in order to direct a sighting means, which may take the form of an astrocompass, to the celestial body selected. If, upon sighting through the telescope of the astrocompass, the observer finds the cross hairs of the astrocompass are not centered properly on the selected celestial body, he may initiate a signal to the correcting system that will, in effect, reorient the local directional reference and consequently drive the cross hairs to proper alignment on the selected celestial body, and in so doing eliminate the error.

In lieu of actual reorientation of the local directional reference, the system in accordance with the present invention provides that the observer correct the local directional reference data output so as to bring the cross hairs of the astrocompass in alignment with the selected celestial body. The correcting system has been so devised that an automatic sun and star tracker, which would continuously monitor the local directional reference, may be employed in place of the astrocompass.

Navigational data and computations are largely dependent upon an arbitrarily chosen reference such as true geographical North, and the accuracy of calculated bearings, courses, and fixes will vary in proportion to the reliability of the chosen local directional reference.

The local directional reference may be a magnetic compass, gyro-compass, gyro-magnetic compass, or directional gyroscope, according to the type of craft and the requisites of the navigational system to be used. Each of these types of reference is customarily subject to errors, ranging from a fraction of a degree to many degrees, that preclude its use for highly precise directional measurements.

In a gyro-magnetic compass, for instance, the gyroscopic element is periodically slaved to magnetic North (with or without compensation for magnetic variational deviation) to correct accumulated error. A gyro-compass becomes increasingly less accurate and sensitive as the polar regions are approached and is subject to errors that are a function of craft velocity. A directional gyroscope will tend to have both steady and random drift so that periodic compensations or corrections must be applied to it.

The present invention comprises a system which provides a reliable means of correcting a local directional reference either periodically or continuously as may be desired.

The concept of the present invention contemplates computing the azimuth (relative to true geographic North) and elevation of a chosen celestial body in the form of appropriate signals, and combining the celestial azimuth signal with a signal representative of the azimuthal position of the craft with respect to its local directional reference. An optical sighting means is then positioned in accordance with the combination, which should be the azimuth of the celestial body with respect to the craft axis headed on that particular bearing, if there is no error in the local directional reference. The sighting means is also positioned at the computed elevation of the celestial body.

Since the computed elevation signal need not be corrected for craft heading, the combination azimuthal signal should position the optical sighting means so that it is aligned directly on the chosen celestial body. If it is assumed that the computer produces accurate signals representative of the input data as outlined above, there remains but one principal supposition to be fulfilled in order for the optical sight to be precisely aligned on the chosen celestial body. The presupposed condition for that alignment is that the local directional reference from which the craft's heading was derived must be a driftless and errorless reference.

If, however, the local directional reference has departed from its proper orientation, such error may be corrected by repositioning the local directional reference so that a signal is generated which, when combined with the azimuthal signal of the celestial body in the manner disclosed herein, will align the sighting means on the chosen celestial body. Alternately, the directional reference data signal may be corrected to effect the same result.

Thus, in effect, this invention refers the craft's local directional reference to the chosen celestial body by means of computing the azimuth and elevation of the celestial body with respect to the craft's azimuthal position as derived from the local directional reference, and by correcting the apparent azimuthal error of an optical sight through reorientation of the local directional reference.

The local directional reference correction made in accordance with the present invention may be equally as readily applied to the data output of the directional reference. In this manner of operation the directional reference is not reoriented but its data output is so corrected that its output signal is the same as would be produced by appropriate reorientation of the local directional reference in space.

The present invention has the primary object of automatically producing a convenient and usable measure of the azimuth error by which a local directional reference deviates from astronomically obtained heading data.

Another object of this invention is to automatically correct the deviation of a local directional reference by making the same correspond with astronomically provided data.

Another object of this invention is to correct the heading data produced by a local directional reference in accordance with its deviation from astronomically obtained azimuth data.

These and other objects and features of the present invention will appear from the description of several embodiments described in connection with illustrative drawings, in which FIG. 1 is a diagram illustrating a typical celestial navigation problem solved in accordance with the present invention;

FIG. 3 is a schematic block diagram of a typical embodiment of the present invention;

FIG. 4 is a schematic block diagram of an automatic tracking device;

FIG. 5 is a gearing schematic of a star tracker which may be employed in connection with the present invention, and FIG. 6 is an isometric schematic view showing a modified form of the star tracking means illustrated in FIG. 5.

Based upon mathematical computation, the local directional reference of a moving craft may be checked and corrected for directional errors by astronomical means. It is important that the local directional reference be accurate since the true heading of the craft, which is used in its navigation, is obtained from this reference. The problem is, firstly, to compute the azimuth of the celestial body with respect to the geographic North based on known data and, secondly, to measure off this angle from the celestial body to determine the true direction of the geographic North.

The basic initial information required when a star body is used as the reference is as follows:

(a) Latitude of the craft, $\lambda$
(b) Longitude of the craft, $\omega$
(c) Greenwich civil time, GCT
(d) Date—day, month and year
(e) Star to be used The latitude and longitude of the craft can be obtained from fixing the craft's position by sighting known reference points on the earth, or it can be obtained by any device which provides latitude and longitude information. In a shipborne system, adequate information of this type may be obtained from radio navigational devices such as Loran, or in the case of an aircraft from a dead reckoning computer which provides position data by integrating the ground velocity of the craft.

The Greenwich civil time is obtained from a precision chronometer which can be any one of several different types, i.e., clock, tuning fork or quartz crystal oscillator type.

Figure 2:
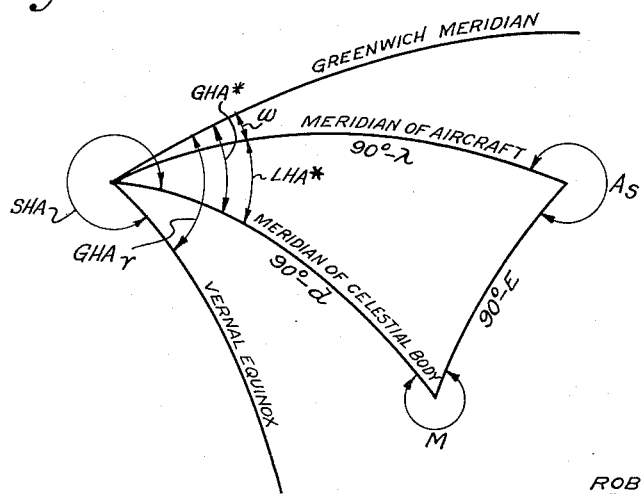
FIG. 2 is a spherical triangle illustrating the mathematical basis for computer calculations made in accordance with the present invention.

From a knowledge of the Greenwich civil time and the date (day, month and year), the Greenwich hour angle of the first point of Aries (or vernal equinox), GHA ♈ can be determined from the "American Nautical Almanac" or other similar almanac. This angle locates the Greenwich meridian with respect to the origin of the celestial sphere. It is measured about the axis of the celestial sphere and is equal to the angle between the Greenwich meridian projected on the celestial sphere and the meridian containing the origin of the celestial sphere, as illustrated in FIG. 2. This angle is measured in much the same manner as the longitude difference between two points on the earth. The axis of the celestial sphere is taken as the continuation of the earth's axis into the celestial sphere. As the earth rotates, the GHA ♈ varies with time and in proportion to the relative angular velocity between the earth and the celestial sphere.

From a knowledge of the particular star to be used and the date (day, month and year) the sidereal hour angle of the star, SHA, can be obtained from the previously mentioned almanac. This angle locates the celestial meridian containing the star, with respect to the meridian containing the origin (vernal equinox) of the celestial sphere. It is measured about the axis of the celestial sphere and does not change significantly for periods of several days.

The sum of the sidereal hour angle and the Greenwich hour angle of the first point of Aries provides the Greenwich hour angle of the star, GHA*. This angle locates the meridian of the star with respect to the Greenwich meridian (SHA+GHA ♈ =GHA*) as shown in FIG. 2.

Figure 1:
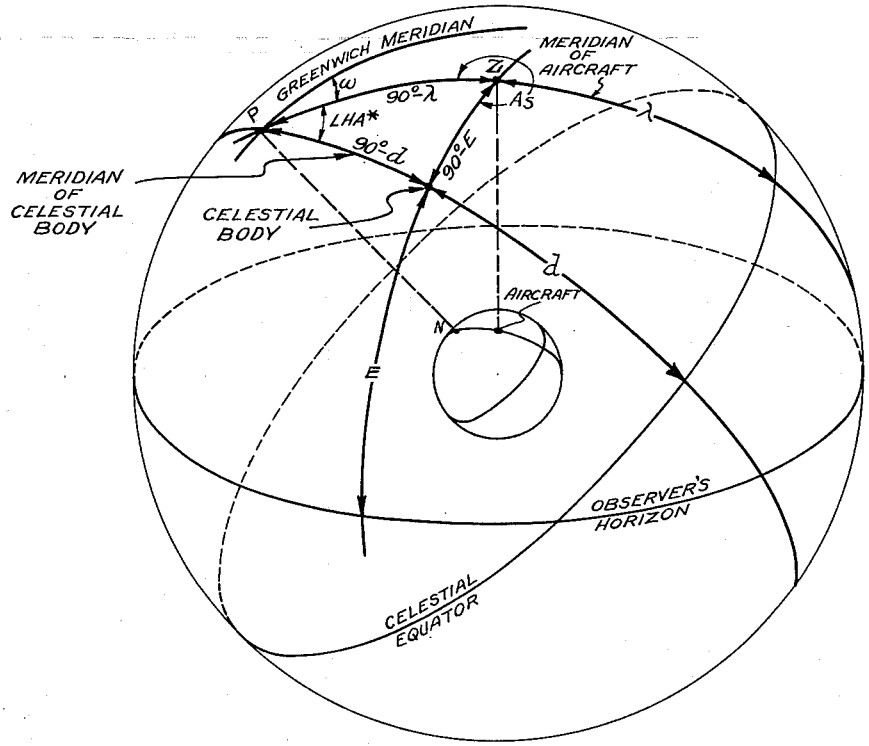

The difference between the Greenwich hour angle of the star and the craft's longitude ($\omega$) gives the local hour angle of the star, LHA*. This angle locates the celestial meridian containing the projection of the position of the aircraft on the earth with respect to the celestial meridian containing the star. (GHA*− west $\omega$=LHA*.) This angle is shown as LHA in FIG. 1 and FIG. 2.

The celestial equator is the projection of the earth's equator on the celestial sphere. The position of the craft is further located on this sphere by means of the craft's latitude. The position of the star is further located in the celestial sphere by means of the star's declination. This is measured from the celestial equator in a manner similar to measuring the latitude of a point on the earth from its equator. The particular star's declination is obtained by referenec to the previously mentioned almanac necessitating only knowledge of the date (day and month). The declination varies very slightly from day to day.

The basic information required when the sun is used as the celestial reference is as follows:

(a) Latitude of the craft, $\lambda$
(b) Longitude of the craft, $\omega$
(c) Greenwich civil time, GCT
(d) Date—(day, month and year)

From the Greenwich civil time and date (day, month and year), the Greenwich hour angle of the sun GHA☉, is obtained from the nautical almanac. This angle locates the sun with respect to the Greenwich meridian and varies directly with time. The change in this angle is due to the relative rotation of the earth with respect to the sun. (It should be noted that in the case of the stars, GHA* was made up of GHA ♈ and SHA, whereas in the case of the sun or the planets, the almanac lists the GHA☉ directly.)

The local hour angle of the sun, LHA☉, is obtained in the same manner as it was for the stars. The declination, $d$, of the sun can be obtained from the almanac if the Greenwich civil time and the date (day, month and year) are known. The declination of the sun changes daily.

In FIG. 2 is shown the spherical triangle which relates the azimuth of the celestial body, $A_S$, and its elevation, $E$, to the local hour angle, declination of the body and latitude of the craft.

The equations relating these angles are:

$$\sin E = \sin \lambda \sin d + \cos \lambda \cos d \cos LHA$$
$$\sin A_S \cos E = \sin LHA \cos d$$
$$\cos A_S \cos E = \cos \lambda \sin d - \sin \lambda \cos d \cos LHA$$

In FIG. 3 is shown a schematic block diagram of one embodiment of the astrocompass directional reference correcting system. The computations performed by this system are disclosed in the following description.

*Local Hour Angle Computation*

The LHA of a star is computed from nautical almanac data and position data by a series of adding differentials. The LHA equation is as follows:

$$LHA = SHA + GHA \,♈\, (a) + t - \omega$$

where:

SHA=sidereal hour angle (the distance in degrees west of the vernal equinox of the particular star which is being observed, as obtained from the almanac).

GHA ♈ ($a$)=Greenwich hour angle of aries (the distance of the vernal equinox west of the Greenwich meridian at the time ($a$)).

$t$=time in degrees rotation of the earth in space that has elapsed since the GHA ♈ ($a$) was introduced into the system.

$\omega$=the west longitude of the craft.

In this computation GHA ♈ ($a$) is manually set into the computer by means of a crank 11 on a differential 10 before the time drive is started. From $t=(a)$ onwards, $t$ is continuously added by means of a constant speed motor 13 driving into the differential 10 so as to produce an analog output GHA$\Upsilon(t)$ corresponding to the value of GHA$\Upsilon$ which progressively changes with time. This result is indicated on a counter 12. Successive differentials 14 and 15 then add SHA and subtract $\omega$ to give LHA as the shaft output of differential 15.

When the astrocompass directional reference correcting system is used during the day with the sun for a reference instead of a star, it is operated in the following manner:

The SHA input to differential 14 is set to zero and GHA$\odot$ (Greenwich hour angle of the sun) is set into the GHA$\Upsilon$ differential 10. The time drive is now driven at a different speed to provide solar time instead of sidereal time to keep the GHA$\Upsilon$ differential input proportional to chronological change. A speed changer 16 is provided to permit the correction of the GHA$\Upsilon$ in either sidereal or solar time.

In the particular embodiment disclosed and shown in FIG. 3, the operations described thus far are performed by analog means. The practice of the present invention is not restricted, however, to such means but may employ other electrical or mechanical means of suitable type to achieve the same purpose without departing from the concept or spirit of the invention.

In the second section of the computer, LHA and $d$ are used to compute $A_S$ and $E$, where $E$ is the elevation of the celestial body. This computation is identical to the computation of the great circle distance and direction between two points, so that the same computer could be used interchangeably or alternately for these computations.

In this computation, two sides and the included angle of a spherical triangle such as is shown in FIG. 2 are given to determine the remaining side and angles. Simultaneous equations can be derived by applying the law of sines and the law of cosines to spherical triangles as follows:

(From Rider's Plane and Spherical Trigonometry)

$$\cos A_S = -\cos \text{LHA} \cos M + \sin \text{LHA} \sin M \cos (90-d) \quad (1)$$

$$\frac{\sin M}{\sin (90-\lambda)} = \frac{\sin \text{LHA}}{\sin (90-E)} = \frac{\sin A_S}{\sin (90-d)} \quad (2)$$

and $$\cos M = -\cos \text{LHA} \cos A_S + \sin \text{LHA} \sin A_S \cos (90-\lambda) \quad (3)$$

Eliminating $M$ from Equation 1 by substitution of sin $M$ and cos $M$ from Equations 2 and 3, $$\cos A_S = \cos^2 \text{LHA} \cos A_S - \cos \text{LHA} \sin \text{LHA} \sin A_S \sin \lambda + \frac{\sin^2 \text{LHA} \sin d \cos \lambda}{\cos E} \quad (4)$$

Simplifying this by use of the identity, $\sin^2 \text{LHA} + \cos^2 \text{LHA} = 1$: $\cos A_S \cos E$ $$= -\frac{\cos \text{LHA} \sin A_S \sin \lambda \cos E}{\sin \text{LHA}} + \sin d \cos \lambda \quad (5)$$

From Equation 2, the following expression may be derived:

$$\cos d = \frac{\sin A_S \cos E}{\sin \text{LHA}} \quad (6)$$

Therefore:

$$\cos A_S \cos E = -\cos d \cos \text{LHA} \sin \lambda + \sin d \cos \lambda \quad (7)$$

From the law of cosines, the following relationship may be had directly:

$$\cos (90-E) = \sin \lambda \sin d + \cos \lambda \cos d \cos \text{LHA} \quad (8)$$

Simplifying Equation 2:

$$\sin A_S \cos E = \sin \text{LHA} \cos d \quad (9)$$

Equations 7, 8 and 9 give the unknowns of the $A_S$ and $E$ computation in terms of the knowns.

The computer is used to solve Equations 7, 8 and 9, as can be seen from FIG. 3. Resolvers 17, 18 and 19 of this computer formulate the right hand side of Equations 7, 8 and 9 by operating on signals proportional to those expressions. Resolvers 20 and 21 combine signals proportional to the mathematical expressions on the left hand sides of these equations to yield signals proportional to $A_S$ and $E$, the azimuth and elevation of the celestial body, respectively. The process is accomplished as follows:

Resolver 17 is excited with a constant A.C. voltage and its shaft is rotated in proportion to $d$, the declination of the chosen celestial body, to give outputs:

$$\sin d$$
$$\cos d$$

Resolver 18 is excited by a signal proportional to $\cos d$ and its shaft rotated in proportion to LHA, the local hour angle, to give outputs:

$$x = \cos d \cos \text{LHA}$$
$$y = \cos d \sin \text{LHA}$$

The $y$ output is equal to $\sin A_S \cos E$ by Equation 9. Resolver 19 is excited by a signal proportional to $\sin d$ on one axis and a signal proportional to $\cos \text{LHA} \cos d$ on the perpendicular axis, and its shaft is rotated in proportion to $\lambda$, the latitude of the craft, to give these outputs:

$$x' = \sin \lambda \sin d + \cos \lambda \cos d \cos \text{LHA}$$
$$y' = \cos \lambda \sin d + \sin \lambda \cos d \cos \text{LHA}$$

From Equation 8 the $x'$ output is equal to $\sin E$ and from Equation 7 the $y'$ output is equal to $-\cos A_S \cos E$.

Resolver 20 is used to produce an output proportional to $A_S$ from the two input signals ($y$ and $y'$) corresponding to $\sin A_S \cos E$ and $\cos A_S \cos E$. The two input signals are fed into perpendicular windings of the resolver 20 and one of two perpendicular output windings is connected through an amplifier 22, to a servomotor 23 which drives a shaft to a position representing $A_S$, the azimuth of the chosen celestial body. If $\rho$ is the instantaneous angular position of this shaft, the signal on the output winding of resolver 20 which is connected to amplifier 22 will be:

$$\cos E (\sin A_S \cos \rho - \cos A_S \sin \rho)$$

This is equivalent to:

$$\cos E \sin (A_S - \rho)$$

This expression will be equal to zero only when $A_S = \rho$, thereby showing that resolver 20 will be driven in angle $A_S$. On the other winding of resolver 20 the following signal will be developed:

$$\cos E \sin A_S \sin \rho + \cos E \cos A_S \cos \rho$$

This is equivalent to:

$$\cos E \cos (A_S - \rho)$$

which is equal to $\cos E$.

Thus the output shaft of the servomotor 23 has the position $A_S$ and the signal supplied to resolver 21 from the last mentioned winding of the resolver 20 has the value $\cos E$.

Resolver 21 is used to produce an output proportional to the difference between the instantaneous angular position of its shaft and $E$ in the same manner that resolver 20 computed $A_S$.

The output of this portion of the computer positions two sets of synchros, one rotated in $E$, the second rotated in $A_S$.

The computer described hereinbefore as part of a typical embodiment of the present invention is one of several types of computing means which may be so employed. Dependent upon design requirements of the overall system and the practical considerations of implementing the invention, other computing means may be used. Examples of such means are: a gimbal computer, a three-dimensional cam computer, and an electrical computer employing suitable potentiometers adapted and interconnected to produce the desired output signals from the input data previously enumerated. While these are typical examples of computing means, the present invention is not so limited, as its concepts may be carried out by the use of any computing means suitable in a practicable embodiment of the invention.

In the preferred embodiment of FIG. 3, the optical sight 24 takes the signal $A_S$ as computed by the star azimuth computer and utilizes it to direct the line of sight of the optical device in accordance with the orientation represented by the $A_S$ signal. The relative angle between the directional reference 25 and the longitudinal axis of the aircraft is an indication of the aircraft's heading with respect to that reference. A motor drive 26 and differential 27 are provided for correcting the error between the directional reference and geographic North as indicated by the system. Therefore, the analog output of the differential 27 is proportional to the craft's true heading, which may be indicated by the symbol $A_T$. This angle is subtracted from the computed azimuth angle of the celestial body, $A_S$, to give the relative bearing of the celestial body, with respect to the craft, which may be represented by the difference signal, $A_S - A_T$.

This operation is accomplished with fine and coarse synchros 28 and 29 associated with the differential 27 which produces an analog output representative of $A_T$, the craft's heading, and fine and coarse differential synchros 30 and 31 associated with the analog output of the servomotor 23, representative of $A_S$, the azimuth of the chosen celestial body. The output signals from synchro differentials 30 and 31 will therefore be representative of $\Theta$, the computed relative bearing of the celestial body, or $A_S - A_T$.

The optical device 24 has its line of sight driven in azimuth by means of a servomechanism system comprising fine and coarse synchros 32 and 33, a mixer 34, an amplifier 48 and a servomotor 49. This servomechanism loop responds to the input signal $\Theta$ to position the optical sight at the computed bearing of the celestial body with respect to the craft.

The optical sight 24 is driven in elevation by a servomechanism which comprises fine and coarse synchros 35 and 36, a mixer 37, an amplifier 38, and a servomotor 39. Fine and coarse indicators 40 and 41 provide convenient readings of elevation of the optical sight 24.

As has previously been described, the output of resolver 21 is a signal proportional to the difference between the instantaneous angular position of its shaft and E, the elevation of the selected celestial body. The difference signal is amplified in an amplifier 42, which drives a servomotor 43 producing an analog output corresponding to the value of E. This shaft output is utilized to position windings of fine and coarse synchros 44 and 45. These synchros produce a signal proportional to E which is transmitted through appropriate connections to the elevation servomechanism.

An isometric schematic representation of one embodiment of an optical sight and its associated driving means is illustrated in FIG. 6. Components bear the same numerical designation as in FIG. 3.

If the indicated value of the craft's azimuth position is not correct (this can be due to directional reference drift), the line of sight of the optical device 24 will not be aligned in azimuth with the celestial body. The observer is provided with a two-way switch 46 which permits him to run the correction motor 26 in that direction which aligns the line of sight of the optical device 24 on the preselected celestial body. In this manner the operator corrects the data output produced by the local directional reference 25 of the system and thus compensates for drift and other error.

The differential 27 shown in FIG. 3 receives input data from both the local directional reference 25 and the correction motor 26 and produces an output which is proportional to the directional reference data as modified by the heading correction data input. Thus the output of the differential 27 is corrected rather than the reference device itself.

The present invention also contemplates that the orientation of the local directional reference may be corrected to bring about the alignment of the optical sight with the selected celestial body. If the directional reference 25 were a directional gyroscope, for instance, the heading correction switch 46 might be connected to control suitable means to cause precessing of the directional gyroscope in such a manner as to reorient the directional reference and produce directional data output which together with the computed data would align the optical sight with the selected celestial body.

A gyroscopic stabilizer 47 in the system provides vertical stabilization to the optical sighting device 24 by means of roll and pitch correction data. As depicted in FIGS. 3 and 6, the optical sighting device of the system is mounted on a horizontally stabilized platform carried by the craft, the device being movable in relation to the platform about a vertical and horizontal axis.

In accordance with the present invention, an automatic sun and star tracker can replace the manually operated astrocompass. For brevity it will be referred to as the tracker. Once such a device is set, it will not only remain aligned with the celestial body, but it will also continuously correct the navigational system's directional reference data. In order to accomplish these objectives, the tracker must be capable of detecting and correcting differences in azimuth ($\Delta A$) and elevation ($\Delta E$) between itself and the system to which it is connected.

The star tracking systems disclosed herein are in general agreement in their methods for correction of the directional reference. The directional reference is in each case continuously corrected by the azimuth error, $\Delta A$, so that in turn the tracker follows the star exactly in azimuth. Correction of the elevational position of the tracker is accomplished by use of the elevation error, $\Delta E$, to control the appropriate tracker servomechanism. Should the star be obscured or lost to view, control of this servo would revert to the celestial data computer, until such time as the renewed presence of an error signal, ($\Delta E$), indicates that normal operating conditions again prevail. Because of this feature it can be assumed that the computation of the directional reference error ($\Delta D$), from azimuth error ($\Delta A$), is unaffected by the elevational error ($\Delta E$).

Since the tracker azimuth error angle $\Delta A$ is measured in a slant plane through the star, means are required for converting it to a horizontal plane error angle ($\Delta D_1$) which is presumed to be the error in the directional reference system. An accurate formula for this conversion where $\Delta D_1$ is an exact conversion and E is the elevation is:

$$\Delta D_1 = \cos^{-1}\left(\frac{\cos \Delta A - \sin^2 E}{\cos^2 E}\right)$$

An approximate, but simpler formula, takes the form:

$$\Delta D_2 = \frac{\Delta A}{\cos E}$$

The table that follows shows the approximate formula is sufficiently precise for most applications where the tracker is employed in a system such as has been outlined.

| ΔA | E | ΔD₁ | ΔD₂ | ΔD₂−ΔD₁ |
|---|---|---|---|---|
| 0°10′ | 0° | 0°10′0″ | 0°10′0″ | 0° |
| 0°10′ | 10° | 0°10′20″ | 0°10′9″ | −0°0′11″ |
| 0°10′ | 20° | 0°10′30″ | 0°10′39″ | +0°0′9″ |
| 0°10′ | 30° | 0°11′30″ | 0°11′33″ | +0°0′3″ |
| 0°10′ | 40° | 0°12′50″ | 0°13′3″ | +0°0′13″ |
| 0°10′ | 45° | 0°14′5″ | 0°14′9″ | +0°0′4″ |
| 0°10′ | 90° | Indef. | Indef. | -------- |

A number of schemes are adaptable to constructing a sun or star tracker. One such concept is disclosed in U.S. Patent No. 2,513,367 issued to L. B. Scott, on July 4, 1950.

FIG. 4 is a schematic diagram of one type of star tracker which may be used with the present invention to effect automatic and continuous reorientation of a directional reference or correction of its data output.

The azimuth drive 50 accepts signals (θ) representing the computed bearing in azimuth of the selected celestial body with respect to craft heading and effects orientation of the star tracker platform in response to those signals. These signals, it will be recalled, are produced by comparison of the computed-azimuth signal ($A_S$) with a signal representing the apparent heading of the craft ($A_T$).

The roll axis drive 51 receives signals ($r$) from the attitude gyroscope 47 (of FIG. 3) and controls the drive which is transmitted to the roll axis so as to stabilize the telescope platform in that degree of freedom of movement.

The elevation drive 52 accepts pitch signals (P) from the attitude gyroscope 47 (of FIG. 3) and stabilizes the telescope in this degree of freedom of movement. The elevation drive also accepts the elevation signal from the computer (E) and positions the tracker to be aligned with the preselected celestial body. The output shaft of the elevation drive therefore is positioned in response to a composite of the pitch synchro signal and the computed elevation synchro signal.

The portion of the star tracker which automatically and continuously corrects the local directional reference as shown in FIG. 4 operates in the following manner. The composite pitch and elevation signal previously mentioned is received by fine and coarse synchros 53 and 54 and a mixer 55, and is then amplified in an amplifier 56. The output of the amplifier 56 drives an elevation servomotor 57 when the system is operated in the search mode.

The difference in azimuth signal ΔA, representing the difference sensed by the tracker between the actual azimuth of the celestial body and the azimuthal angle of the telescope or light sensitive device, is fed to an amplifier 59 where it is combined with a feedback signal from the directional reference correcting servomechanism loop. The output of the amplifier 59 is the error signal corresponding to the error ΔD in the directional reference. When this error is reduced to zero by feeding it to motor 26 by way of a suitable motor amplifier, the local directional reference used by the system is corrected for drift and accumulated error.

In the track mode of operation, a switch 58, which may be operated by a relay, connects the difference in elevation signal, ΔE, to the elevation amplifier 56. The elevation servomotor 57 positions a cosine potentiometer 60, in addition to the tracker elevation drive. The potentiometer signal is fed to the amplifier 59 where it acts to multiply the previously mentioned ΔA signal from the tracker by $$\frac{1}{\cos(E-P)}$$

in order to correct the ΔD signal as the slant plane containing ΔA changes.

The tracking system described operates on an error signal derived from the relative angular dispositions of a star tracker aligned with the selected celestial body and the computed azimuth of the celestial body with respect to the craft heading. In such a system the light-sensitive tracking device "locks on" the celestial body.

An alternative system may be employed wherein the star tracker is slaved through an appropriate servomechanism to the computed azimuthal data signals. It is assumed in this system that the compute data will drive the star tracker to an azimuthal position where the selected celestial body is in the field of view of the light-sensitive element of the tracker, though the tracker need not be precisely aligned with the chosen celestial body. The tracker of this system will produce a signal of amplitude and sense correlated to its angular displacement from precise alignment with the celestial body. This error signal is used to correct the orientation of a local directional reference or to correct the data output of a local directional reference in a manner similar to that detailed in connection with the other systems described hereinbefore.

FIG. 5 is an isometric schematic diagram intended to illustrate typical gearing relationships of servomechanism drives in a system embodying the present invention when used in conjunction with one type of automatic star tracker. In this diagram it can be seen that the azimuth servo system 50 positions the tracker platform 61 in azimuth. The roll data system 51 stabilizes the tracker in that degree of freedom of movement about the gimbals 62 of its roll axis.

The elevation position of the tracker shown in FIG. 5 is controlled about the elevation or pitch axis gimbals 63 by appropriately interconnected pitch and computed elevation data servo systems 52′. A composite signal control is thus achieved in this degree of freedom of movement.

In the apparatus of FIG. 5, the pitch stabilization data is mechanically linked to the star tracker. This is an alternate method of implementing the stabilization of the star tracker as contrasted to that shown in the schematic diagram of FIG. 4 in which the pitch data in the form of electrical signals is combined with computed elevational data signals to form a composite signal which in turn positions the light-sensitive element in elevational position. The platform 61 carried by the craft in the form of the invention shown in FIG. 5 supports the sighting means, telescope, or tracker for movement about a vertical axis and two mutually perpendicular horizontal axes. The sighting means is controlled about one of its horizontal axes by roll stabilization data. It is directed about the other of its horizontal axes by the celestial elevation analog position and pitch stabilization data. Relative to the vertical or azimuth axis, the sighting means is directed in accordance with the difference θ between the celestial azimuth analog position and the output of the local directional reference.

Since many changes could be made in the components comprising this invention and many apparently widely different embodiments of this invention could be made without departing from the scope thereof, it is intended that all matter contained in the above description shall be interpreted as illustrative and not in a limiting sense.

What is claimed is:

1. A system providing an output in accordance with the true heading of a dirigible craft including means for providing an output corresponding to the azimuth of the craft according to a local directional reference, means for producing signals corresponding to the local hour angle of a celestial body with respect to the craft, the declination of the celestial body and the lattitude of the craft, means for combining said signals to produce analog positions corresponding to the azimuth and elevation of the celestial body, means for sighting the celestial body from the craft movable about a vertical axis and a horizontal axis, means for controlling said sighting means about its horizontal axis in accordance with the celestial elevation analog position, means responsive to the difference between the celestial azimuth analog position of said combining means and the output of the local directional reference output means for controlling said sighting means about its vertical axis, and means for correcting the output of the local directional reference output means to provide a true heading output with the celestial body in the line of sight of said sighting means.

2. A system providing an output in accordance with the true heading of a dirigible craft including means for providing an output corresponding to the azimuth of the craft according to a local directional reference, means for producing signals corresponding to the local hour angle of a celestial body with respect to the craft, the declination of the celestial body and the latitude of the craft, means for combining said signals to produce analog positions corresponding to the azimuth and elevation of the celestial body, a horizontally stabilized platform carried by the craft having an optical sighting device thereon movable about a vertical axis and a horizontal axis, means for controlling said sighting device about its horizontal axis in accordance with the celestial elevation analog position, means for controlling said sighting device about its vertical axis in accordance with the difference between the celestial azimuth analog position and the output of said local reference output means, and means including a motor having an input to said vertical axis controlling means for correcting the output of said local directional reference output means to provide a true heading output with the celestial body in the line of sight of said sighting device.

3. A system providing an output in accordance with the true heading of a dirigible craft including means for providing an output corresponding to the azimuth of the craft according to a local directional reference, means for producing signals corresponding to the local hour angle of a celestial body with respect to the craft, the declination of the celestial body and the latitude of the craft, means for combining said signals to produce analog positions corrseponding to the azimuth and elevation of the celestial body, an optical device carried by the craft for sighting the celestial body having a vertical axis and two mutually perpendicular horizontal axes, means for providing a stabilizing signal for the device relative to the roll axis of the craft, means for providing a stabilizing signal for the device relative to the pitch axis of the craft, means for controlling said device about one of its horizontal axes in accordance with the signal of the roll stabilizing means, means for controlling said device about the other of its horizontal axes in accordance with the celestial elevation analog position and the signal of the pitch stabilizing means, means for controlling said device about its vertical axis in accordance with the difference between the celestial azimuth analog position and the output of said local reference output means, and means including a motor having an input to said vertical axis controlling means for correcting the output of said local directional reference output means to provide a true heading output with the celestial body in the line of sight of said optical device.

4. A system providing an output in accordance with the true heading of a dirigible craft including differential means having an input operatively connected to a local directional reference, a second input and a true heading output, means for producing signals corresponding to the local hour angle of a celestial body with respect to the craft, the declination of the celestial body and the latitude of the craft, means for combining said signals to produce analog positions corresponding to the azimuth and elevation of the celestial body, means for sighting the celestial body from the craft movable about a vertical axis and a horizontal axis, means for controlling said sighting means about its horizontal axis in accordance with the celestial elevation analog position, means for controlling said sighting means about its vertical axis in accordance with the difference between the celestial azimuth analog position and the output of said differential means, and means providing an input to the second input of said differential means for correcting the true heading output thereof to maintain the celestial body in the line of sight of said sighting means.

5. A system providing an output in accordance with the true heading of a dirigible craft including differential means having an input operatively connected to a local directional reference, a second input and a true heading output, means for producing signals corresponding to the local hour angle of a celestial body with respect to the craft, the declination of the celestial body and the latitude of the craft, means for combining said signals to produce analog positions corresponding to the azimuth and elevation of the celestial body, a horizontally stabilized platform carried by the craft having an optical sighting device therein movable about a vertical axis and a horizontal axis, means for controlling said device about its horizontal axis in accordance with the celestial elevation analog position, means for controlling said device about its vertical axis in accordance with the difference between the celestial azimuth analog position and the output of said differential means, and means including a motor operatively connected to the second input of said differential means for correcting the true heading output thereof to maintain the celestial body in the line of sight of said sighting device.

6. A system providing an output in accordance with the true heading of a dirigible craft including differential means having an input operatively connected to a local directional reference, a second input and a true heading output, means for producing signals corresponding to the local hour angle of a celestial body with respect to the craft, the declination of the celestial body and the latitude of the craft, means for combining said signals to produce analog positions corresponding to the azimuth and elevation of the celestial body, an optical device carried by the craft for sighting the celestial body having a vertical axis and two mutually perpendicular horizontal axes, means for providing a stabilizing signal for the device relative to the roll axis of the craft, means for providing a stabilizing signal for the device relative to the pitch axis of the craft, means for controlling said device about one of its horizontal axes in accordance with the signal of said roll stabilizing means, means for controlling said device about the other of its horizontal axes in accordance with the celestial elevation analog position and the signal of said pitch stabilizing means, means for controlling said device about its vertical axis in accordance with the difference between the celestial azimuth analog position and the output of said differential means, and means including a motor operatively connected to the second input of said differential means for correcting the true heading output thereof to maintain the celestial body in the line of sight of said optical sighting device.

7. A system for correcting the output of a local directional reference on a craft including means for providing an output corresponding to the azimuth of the craft according to a local directional reference, means for producing signals corresponding to the local hour angle of a celestial body with respect to the craft, the declination of the celestial body and the latitude of the craft, means for combining said signals to produce analog positions corresponding to the azimuth and elevation of the celestial body; a device for sighting the celestial body from the craft movable about a vertical axis and a horizontal axis including light sensitive signal means for detecting departure of the device from a line of sight condition with relation to the celestial body about its vertical axis, means for controlling said sighting device about its horizontal axis in accordance with the celestial elevation analog position, means for controlling said sighting device about its vertical axis in accordance with the difference between the celestial azimuth analog position and the output of said local reference output means, and means responsive to the signal of said light sensitive signal means for correcting the output of the local directional reference output means to restore the sighting device to its line of sight condition about the vertical axis with relation to the celestial body.

8. A system for correcting the output of a local directional reference on a craft including means for providing an output corresponding to the azimuth of the craft according to a local directional reference, means for producing signals corresponding to the local hour angle of a celestial body with respect to the craft, the declination of the celestial body and the latitude of the craft, means for combining said signals to produce analog positions corresponding to the azimuth and elevation of the celestial body; a horizontally stabilized platform carried by the craft having an optical sighting device thereon movable about a vertical axis and a horizontal axis including, light sensitive signal means for detecting departure of the device from a line of sight condition with relation to the celestial body about its vertical axis; means for controlling said sighting device about its horizontal axis in accordance with the celestial elevation analog position, means for controlling said sighting device about its vertical axis in accordance with the difference between the celestial azimuth analog position and the output of said local reference output means, and motive means operated by the signal of said light sensitive signal means for correcting the output of the local directional reference output means to restore the sighting device to its line of sight condition about the vertical axis with relation to the celestial body.

9. A system for correcting the output of a local directional reference on a craft including means for providing an output corresponding to the azimuth of the craft according to a local directional reference, means for producing signals corresponding to the local hour angle of a celestial body with respect to the craft, the declination of the celestial body and the latitude of the craft, means for combining said signals to produce analog positions corresponding to the azimuth and elevation of the celestial body; an optical device carried by the craft for sighting the celestial body having a vertical axis and two mutually perpendicular horizontal axes including light sensitive signal means for detecting departure of the device from a line of sight condition with relation to the celestial body about its vertical axis; means for providing a stabilizing signal for the device relative to the roll axis of the craft, means for providing a stabilizing signal for the device relative to the pitch axis of the craft, means for controlling said device about one of its horizontal axes in accordance with the signal of the roll stabilizing means, means for controlling said device about the other of its horizontal axes in accordance with the celestial elevation analog position and the signal of said pitch stabilizing means, means for controlling said device about its vertical axis in accordance with the difference between the celestial azimuth analog position and the output of said local reference output means, and means operated by the signal of said light sensitive signal means for correcting the output of the local directional reference output means to restore the sighting device to a line of sight condition about the vertical axis with relation to the celestial body.

10. A system for correcting the output of a local directional reference on a craft including means for providing an output corresponding to the azimuth of the craft according to a local directional references, means for producing signals corresponding to the local hour angle of a celestial body with respect to the craft, the declination of the celestial body and the latitude of the craft, means for combining said signals to produce an analog position corresponding to the azimuth of the celestial body; an optical device carried by the craft for sighting the celestial body having a vertical axis and two mutually perpendicular horizontal axes, including light sensitive signal means for detecting departure of the device from a line of sight condition with relation to the celestial body about its vertical axis, and light sensitive means for detecting departure of the device from a line of sight condition with relation to the celestial body about one of its horizontal axes; means for providing a stabilizing signal for the device relative to the roll axis of the craft, means for controlling the sighting device about the other of its horizontal axes in accordance with the signal of the roll stabilizing means, means for controlling the sighting device about the one of its horizontal axes in accordance with the signal from the horizontal axis light sensitive signal means, means for controlling said device about its vertical axis in accordance with the difference between the celestial azimuth analog position and the output of said local reference output means, and means operated by the signal of said vertical axis light sensitive signal means for correcting the output of the local directional reference output means to restore the sighting device to its line of sight condition about the vertical axis with relation to the celestial body.

11. A system as claimed in claim 10, in which said last-named means is also operated by a cosine function of the signal of said horizontal axis light sensitive signal means.

12. A system for correcting the local directional reference of a dirigible craft including differential means having an input operatively connected to a local directional reference, a second input and an output, means for producing signals corresponding to the local hour angle of a celestial body with respect to the craft, the declination of the celestial body and the latitude of the craft, means for combining said signals to produce analog positions corresponding to the azimuth and elevation of the celestial body; a device for sighting the celestial body from the craft movable about a vertical axis and a horizontal axis including light sensitive signal means for detecting departure of the device from a line of sight condition with relation to the celestial body about its vertical axis; means for controlling said sighting device about its horizontal axis in accordance with the celestial elevation analog position, means for controlling said sighting device about its vertical axis in accordance with the difference between the celestial azimuth analog position and the output of said differential means, and means operated by the signal of said light sensitive signal means connected to the second input of said differential means for correcting the output thereof to restore the sighting device to a line of sight condition about the vertical axis with relation to the celestial body.

13. A system for correcting the local directional reference of a dirigible craft including differential means having an input operatively connected to a local directional reference, a second input and an output, means for producing signals corresponding to the local hour angle of a celestial body with respect to the craft, the declination of the celestial body and the latitude of the craft, means for combining said signals to produce analog positions corresponding to the azimuth and elevation of the celestial body; a a horizontally stabilized platform carried by the craft having an optical sighting device thereon movable about a vertical axis and a horizontal axis including light sensitive signal means for detecting departure of the device from a line of sight condition with relation to the celestial body about its vertical axis; means for controlling said sighting device about its horizontal axis in accordance with the celestial elevation analog position, means for controlling said sighting device about its vertical axis in accordance with the difference between the celestial azimuth analog position and the output of said differential means, and means operated by the signal of said light sensitive signal means connected to the second input of said differential means for correcting the output thereof to restore the sighting device to a line of sight condition about the vertical axis with relation to the celestial body.

14. A system for correcting the local directional reference of a dirigible craft including differential means having an input operatively connected to a local directional reference, a second input and an output, means for producing signals corresponding to the local hour angle of a celestial body with respect to the craft, the declination of the celestial body and the latitude of the craft, means for combining said signals to produce analog positions corresponding to the azimuth and elevation of the celestial body; an optical device carried by the craft for sighting the celestial body having a vertical axis and two mutually perpendicular horizontal axes including light sensitive signal means for detecting departure of the device from a line of sight condition with relation to the celestial body about its vertical axis; means for providing a stabilizing signal for the device relative to the roll axis of the craft, means for providing a stabilizing signal for the device relative to the pitch axis of the craft, means for controlling said device about one of its horizontal axes in accordance with the signal of the roll stabilizing means, means for controlling said device about the other of its horizontal axes in accordance with the celestial elevation analog position and the signal of said pitch stabilizing means, means for controlling said sighting device about its vertical axis in accordance with the difference between the celestial azimuth analog position and the output of said differential means, and means operated by the signal of said light sensitive signal means connected to the second input of said differential means for correcting the output thereof to restore the sighting device to a line of sight condition about the vertical axis with relation to the celestial body.

15. A system for correcting the local directional reference of a dirigible craft including differential means having an input operatively connected to a local directional reference, a second input and an output, means for producing signals corresponding to the local hour angle of a celestial body with respect to the craft, the declination of the celestial body and the latitude of the craft, means for combining said signals to produce an analog position corresponding to the azimuth and elevation of the celestial body; an optical device carried by the craft for sighting the celestial body having a vertical axis and two mutually perpendicular horizontal axes, including light sensitive signal means for detecting departure of the device from a line of sight condition with relation to the celestial body about its vertical axis, and light sensitive signal means for detecting departure of the device from a line of sight condition with relation to the celestial body about one of its horizontal axes; means for providing a stabilizing signal for the device relative to the roll axis of the craft, means for controlling the sighting device about the other of its horizontal axes in accordance with the signal of the roll stabilizing means, means for controlling the sighting device about the one of its horizontal axes in accordance with the celestial elevation analog position and the signal from the horizontal axis light sensitive signal means, means for controlling said device about its vertical axis in accordance with the difference between the celestial azimuth analog position and the output of said differential means, and means operated by the signal of said vertical axis light sensitive means connected to the second input of said differential means for correcting the output thereof to restore the sighting device to a line of sight condition about the vertical axis with relation to the celestial body.

16. A system as claimed in claim 15, in which said last-named means is also operated by a cosine function of the signal of said horizontal axis light sensitive signal means.

17. A system providing a measure of the true heading of a dirigible craft including means for providing a signal corresponding to the azimuth of the craft according to a local direction reference, means for deriving a signal according to the azimuth of a celestial body, means for deriving a signal according to the elevation of the celestial body, means for sighting the celestial body from the craft movable about a vertical axis and a horizontal axis, means for controlling said sighting means about its horizontal axis in accordance with the celestial elevation signal, means for controlling said sighting means about its vertical axis in accordance with the difference between the celestial azimuth signal and the signal of said local directional reference signal means, and input means connected to correct the signal of said local directional reference signal means in accordance with the difference between the azimuthal angle of the sighting means and the actual azimuth of the celestial body thereby providing a measure of the true heading of the craft with the celestial body in the line of sight of said sighting means.

18. A navigation system for a craft comprising, heading means for obtaining an indication of approximate craft heading, astral tracking means, means for directing said astral tracking means toward a selected celestial body, means for obtaining an error signal therefrom the magnitude of which is proportional to the departure in azimuth of said astral tracking means from the true azimuth of said celestial body, means for correcting said approximate craft heading by said error signal to obtain a true craft heading output, triangle solving means having inputs impressed thereon representative of the geographical position of said celestial body and present position of said craft and producing therefrom an azimuth output representative of the azimuth of said celestial body, means for combining said azimuth output and said true craft heading output to produce therefrom a relative bearing output, and means for controlling the bearing of said astral tracking means by said relative bearing output.

19. A navigation system for a craft comprising, heading means for obtaining an output of approximate craft heading, a triangle solving means having inputs impressed thereon representative of the geographical position of a selected celestial body and the present position of said craft and producing therefrom a first output representative of the altitude of said selected celestial body and a second output representative of the azimuth of said celestial body, an astral tracking means, means for adjusting the altitude of said astral tracking means in accordance with said first output of said triangle solving means, means for adding said craft heading output and said second output of said triangle solving means to obtain a celestial body bearing output, means for adjusting the bearing of said astral tracking means by said bearing output, means for obtaining a first error signal from said astral tracking means proportional to the departure in the altitude of said astral tracking means from the true altitude of said celestial body, means for revising said first output of said triangle solver in accordance with said first error signal, means for obtaining a second error signal from said astral tracking means proportional to the departure in azimuth of said astral tracking means from the true azimuth of said celestial body, and means for correcting said approximate craft heading by said second error signal whereby said approximate craft heading is converted to true craft heading.

References Cited in the file of this patent

UNITED STATES PATENTS

| | | |
|---|---|---|
| 2,403,091 | Lear | July 2, 1946 |
| 2,444,933 | Jasperson | July 13, 1948 |
| 2,464,544 | Agins | Mar. 15, 1949 |
| 2,492,148 | Herbold | Dec. 27, 1949 |
| 2,532,402 | Herbold | Dec. 5, 1950 |
| 2,762,123 | Schultz et al. | Sept. 11, 1956 |
| 2,922,224 | Gray | Jan. 26, 1960 |